Achelis & Poppenhusen.
Measuring Distances

Nº 75824          Patented Mar. 24, 1868

Witnesses.                                 Inventor:
Thos Trusche                        G Achelis
Wm Trewin                          H Poppenhusen
                                           Per
                                           Attorneys

United States Patent Office.

GEORGE ACHELIS, OF WESTCHESTER, PENNSYLVANIA, AND HERMANN POPPENHUSEN, OF NEW YORK, N. Y.

Letters Patent No. 75,824, dated March 24, 1868.

IMPROVEMENT IN INSTRUMENTS FOR MEASURING DISTANCES.

The Schedule referred to in these Letters Patent and making part of the same.

TO ALL WHOM IT MAY CONCERN:

Be it known that we, GEORGE ACHELIS and HERMANN POPPENHUSEN, of Westchester, in the county of Chester, and State of Pennsylvania, and the city of New York, respectively, have invented a new and improved Instrument for Measuring Distances, &c.; and we do hereby declare that the following is a full, clear, and exact description thereof, which will enable others skilled in the art to make and use the same, reference being had to the accompanying drawings forming part of this specification, in which—

Similar letters of reference indicate like parts.

This invention is a new and useful instrument, designed for the use of artists and students of nature and art, to enable them to transfer to a drawing approximate proportions and distances of objects in a landscape with greater accuracy than is possible with the unaided observation of the eye. It consists in two sighting-bars or rods pivoted to each other like a pair of scissors, which are opened and closed by a thumb-screw to mark upon a graduated scale proportionate distances of objects observed by the eye of the artist directed to the points requiring measurement in line with the ends of the sighting-bars, as hereinafter explained.

Figure 1:
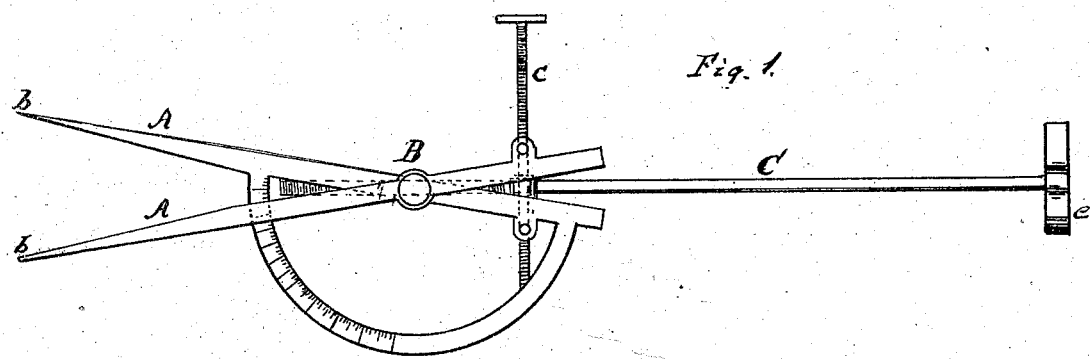
Figure 1 is a top view of our invention, showing the extension of the sight-points on the instrument for determining the relative distance and proportion of things observed in a landscape.
Figure 2:
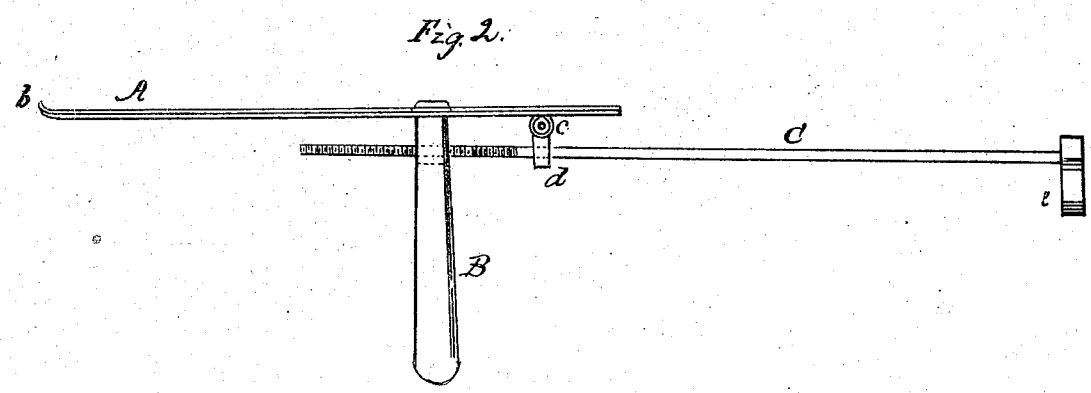
Figure 2 is a side view of the same, showing the method of applying the instrument to the eye and taking an observation with it.

A A are two bars pivoted to each other upon the end of a handle, B, placed at right angles. The bars A A have points or sights $b\ b$ at their extremities, and are connected by a thumb-screw, $c$, by which the ends with the sights $b\ b$ on them may be closed or opened any required distance apart. On one of the bars is attached a protractor, D, bearing on its face a graduated scale for measuring distances and dimensions. A long rod, C, is screwed into the handle B for extension or contraction, more or less, for placing the sights further from or nearer to the eye, as required. The rod passes through a guide-ring, $d$, and on its outer end is a rest, $e$, for placing against the cheek to take an observation, as shown in fig. 2.

The mode of applying and using this instrument is as follows, to wit: The handle B is taken in the left hand and the rest $e$ placed against the cheek at such point directly under the eye that the line of vision shall be able to pass through the sights $b\ b$ on the outer ends of the bars A A; when an observation is taken, the right hand at the same time operating with the thumb-screw $c$ to open or close the bars until the sights $b\ b$ are both in line with the two objects whose distance apart or dimensions from side to side, like a hill or a field, are to be determined. When the bars A A are opened or closed to bring the sights in line with the two points of measurement, reference to the graduated scale will determine approximately the distance between any two points observed. Thus all the objects within view in a landscape may be successively observed and compared with each other, and their approximate size and relation to each other may be determined and transferred to a drawing on the spot, by which means a more correct picture may be taken than is possible by the eye alone. For students, in landscape drawing, this instrument will serve to correct mistakes of the eye in judging of size and distance, and discipline it to judge correctly.

When the instrument is used, the rod C is to be fixed in its position for the observation of one landscape, and a multiple of: two, three, or more is to be selected for the measurements which are successively indicated on the graduated scale of the protractor between the bars or legs A A of the instrument. The instrument is held with the bars A A in a horizontal position for observing horizontal magnitudes, and in a vertical position for observing vertical magnitudes, whereby the position of an object in the perspective of the drawing is determined.

Having thus described our invention, we claim as new, and desire to secure by Letters Patent—

The instrument for measuring approximately the relative size and proportion of objects seen in a landscape, constructed and operating substantially as and for the purposes described.

The above specification of our invention signed by us, this 27th day of February, 1867.

GEORGE ACHELIS,
HERMANN POPPENHUSEN.

Witnesses:
WM. F. McNAMARA,
ALEX. F. ROBERTS.